United States Patent [19]

Van Lint et al.

[11] Patent Number: 5,449,400
[45] Date of Patent: Sep. 12, 1995

[54] NEW INDELIBLE INK FORMULATION

[75] Inventors: Greg Van Lint, Hoegarden, Belgium; Samuel T. Bebbington, Middleton, United Kingdom

[73] Assignee: Imperial Chemical Industries PLC, Millbank, United Kingdom

[21] Appl. No.: 237,282

[22] Filed: May 3, 1994

[30] Foreign Application Priority Data

May 5, 1993 [GB] United Kingdom ............... 9309184

[51] Int. Cl.$^6$ .............................................. C09D 11/02
[52] U.S. Cl. ................................ 106/23 B; 106/23 H; 106/23 K
[58] Field of Search ................. 106/23 B, 23 H, 23 K

[56] References Cited

U.S. PATENT DOCUMENTS

| | | | |
|---|---|---|---|
| 4,666,519 | 5/1987 | Akiyama et al. ............... | 106/22 K |
| 5,279,652 | 1/1994 | Kaufmann et al. ............... | 106/23 H |

*Primary Examiner*—Helene Klemanski
*Attorney, Agent, or Firm*—Charles Q. Buckwalter

[57] ABSTRACT

A stable indelible colored ink composition for invalidating bank notes or similar valuables by staining them permanently, comprises at least one of di- or tri-phenyl-guanidine.

8 Claims, No Drawings

NEW INDELIBLE INK FORMULATION

TECHNICAL FIELD

The present invention is directed to an ink composition and the use of such composition for invalidating bank notes or similar valuables by staining them permanently.

RELATED APPLICATION

The present invention may also be used in a device claimed in a contemporaneously filed application Ser. No. 08/237,283, filed May, 1994 (docket 37554US), and the contents thereof are incorporated herein by reference.

BACKGROUND OF THE INVENTION

As a protection against fraud, it is known to incorporate diphenylguanidine, preferably complexed with various agents, as colorless ink in valuable papers that will develop a conspicuous color for example during attempted erasure by bleaching cheques.

Diphenyl-guanidine will indeed provide a conspicuous stain in the case ink eradicators such as oxidising agents (typically sodium hypochlorite) are used during an attempt to remove the dye and/or the pigments which have been sprayed or sprinkled on the valuables.

In the above prior art the inks were used for safety papers at the manufacturing or printing steps.

However, there is a need for a colored ink formulation stable for a long period of time and within a large range of temperature which produces stable and permanent stain that cannot be leached by current agents such as sodium hypochlorite.

SUMMARY OF THE INVENTION

According to the invention, there is disclosed a stable ink formulation adapted for use in security devices such as in bank notes dispensers or transportation systems. For this purpose, the formulation must be stable for a long time in the wide range of temperature as encountered by the above dispensers located in public places and operating in winter or summer periods.

According to the invention, it has been found that a di- or triphenylguanidine may advantageously be incorporated in a colored ink which will meet the above requirement.

According to a particular embodiment, the ink formulation contains a dye, a pigment, a dispersant and a di- or tri-phenylguanidine in a suitable organic solvent.

Surprisingly, it has furthermore been found that the above combination will result in a stable ink providing maximum penetration of a block of banknotes and permanent stain that cannot be leached using all available techniques.

The formulation, incorporated in a suitable device, will in operation color extensively the stack or bundle of bank notes in a container, the action of the ingredients being complementary.

The dye will perform in depth while the action of the pigment is more permanent and tenacious but will be more limited to the surface, the diffusion thereof being limited. The above combination results however in a synergistic effect as to the stability of the resulting stain.

A particularly suitable formulation in accordance with the invention comprises:

an alcohol type soluble dye (0.5-3% by weight)
a pigment (0.1-1%)
a surface active agent being a dispersant compatible with the pigment (2-5%)
diphenyl guanidine (2-20% preferably 5-15%)
a compatible organic solvent (76-92%)

Preferably the organic solvent is an alcohol based solvent, such as industrial methylated ethanol, the dye is an azo-chrome complex dyestuff.

Preferably the surface active agent is a polyoxyalkylene amine derivative.

According to a particularly preferred embodiment of the invention the formulation comprises, in the above ranges of concentration:

Lampronol Red 2BRN (C I Solvent Red 122)
Solsperse 20,000
Monolite Rubine 3B
diphenyl guanidine
industrial methylated spirits 74 OP Lampronol, Solsperse and Monolite are ICI PLC trademarks.

The formulation according to the invention is obtained by simply mixing the various components according to the methods well-known in the art.

Diphenylguanidine is commercialized under the trademark Perminal (ICI PLC, Francolor).

A particularly suitable formulation comprises (weight %):

| | |
|---|---|
| 1.5–2.2% | Lampronol Red 2BRN |
| 0.3–0.7% | Solsperse 20.000 |
| 2.8–3.8% | Monolite Rubine 3B CI |
| 8–12% | diphenyl guanidine |
| 81–87% | industrial methylated spirits 74 OP |

Example:

A formulation is prepared according to the known techniques of mixing ingredients for manufacturing inks, containing the following ingredients:

| | |
|---|---|
| 2.0% | Lampronol Red 2BRN |
| 0.5% | Solsperse 20.000 |
| 3.5% | Monolite Rubine 3B CI |
| 10% | Perminal DPG (N.O.T.) |
| 84% | Industrial methylated Spirits 74 OP81 |

A bundle of 1000 test banknotes have been stained by the above formulation using a conventional sprinkling device incorporated in a preloaded banknotes cassette wherein valuables are bank notes stacked in a rechargeable cassette. The stains (Bordeaux) covered more than 20% of the surface of the banknotes.

Attempts to remove the stain coloration have been unsuccessfully performed, 15 minutes and 24 hours after staining, using the following agents:

ethanol, acetone, tricholoethylene, chloroform, ethyl acetate, white spirit, dimethylformamide, Javelle water, vinegar, acetone+chloroform+sodium or potassium hypochlorite (successively), hydrochloric acid and various washing compositions (detergents at 95° C.). In the worse cases, a rose or yellow coloration was maintained and/or the texture of the paper and the printing ink used for its manufacture were severely and noticeable altered.

We claim:

1. A colored ink formulation comprising, 2–20% by weight of at least one phenyl-substituted guanidine selected from the group consisting of di- and triphenyl-guanidine.

2. The ink formulation claimed in claim 1 for sprinkling wherein the said phenyl-substituted guanidine is present in an amount ranging from 5 to 15% by weight.

3. The ink formulation claimed in claim 1 comprising at least by % weight :
   0.5-3% by weight of an alcohol soluble dye
   0.1-1% of a pigment
   2-5% of a surface active agent being a dispersant compatible with the pigment
   5-15% of said phenyl-substituted guanidine
   76-92% of an organic solvent 4. The formulation claimed in claim 3 wherein the dye is an azo-chrome complex dyestuff.

5. The formulation claimed in claim 3 wherein the dye is a C.I. solvent red 122 dye.

6. The formulation claimed in claim 3 wherein the surfactant is a polyoxyalkylene amine derivative.

7. The method of using the ink formulation claimed in claim 1 for sprinkling onto paper valuables in security containers.

8. The method of using the ink formulation claimed in claim 1 wherein the valuables are bank notes Stacked in a rechargeable cassette.

* * * * *